US011877137B2

(12) United States Patent
Qiao et al.

(10) Patent No.: US 11,877,137 B2
(45) Date of Patent: Jan. 16, 2024

(54) BACKPLATE FOR RECORDING MICROPHONE, AND RECORDING MICROPHONE

(71) Applicant: Jiusheng (Tangshan) Technology Co., Ltd., Hebei (CN)

(72) Inventors: Qiong Qiao, Hebei (CN); Peng Wang, Hebei (CN); Liang Li, Hebei (CN); Zhaoming Lv, Hebei (CN)

(73) Assignee: Jiusheng (Tangshan) Technology Co., Ltd., Tangshan (CN)

( * ) Notice: Subject to any disclaimer, the term of this patent is extended or adjusted under 35 U.S.C. 154(b) by 259 days.

(21) Appl. No.: 17/395,447

(22) Filed: Aug. 5, 2021

(65) Prior Publication Data

US 2022/0417667 A1 Dec. 29, 2022

Related U.S. Application Data

(63) Continuation of application No. PCT/CN2021/103174, filed on Jun. 29, 2021.

(51) Int. Cl.
*H04R 9/08* (2006.01)
*H04R 7/00* (2006.01)
*H04R 31/00* (2006.01)

(52) U.S. Cl.
CPC ................. *H04R 9/08* (2013.01); *H04R 7/00* (2013.01); *H04R 31/00* (2013.01)

(58) Field of Classification Search
CPC .................................... H04R 9/08; H04R 7/00
USPC .................................................. 381/355–356
See application file for complete search history.

(56) References Cited

U.S. PATENT DOCUMENTS 4,149,034 A * 4/1979 Frosch .................... G10K 11/28 381/160
4,264,790 A * 4/1981 Zlevor .................... H04R 1/342 381/357
6,408,080 B1 * 6/2002 Koizumi ................ H04R 1/342 381/160
6,625,288 B1 * 9/2003 Koizumi .................. H01Q 1/08 381/160
2004/0114778 A1 * 6/2004 Gobeli .................... H04R 17/00 381/174

FOREIGN PATENT DOCUMENTS

| | | | |
|---|---|---|---|
| CH | 188656 | A | 1/1937 |
| CN | 101076206 | A | 11/2007 |
| CN | 103067833 | A | 4/2013 |
| CN | 204721605 | U | 10/2015 |
| CN | 206932406 | U | 1/2018 |
| CN | 206932407 | U | 1/2018 |
| CN | 113507682 | A | 10/2021 |
| JP | 2007194913 | A | 8/2007 |

* cited by examiner

*Primary Examiner* — Suhan Ni

(57) ABSTRACT

The present application relates to a backplate for a recording microphone, and the recording microphone, belonging to the technical field of acoustoelectric conversion. A surface, facing a diaphragm, of the backplate is a spherical surface recessed away from the diaphragm. According to the backplate for the recording microphone and the recording microphone provided by the present application, the maximum sound pressure level that the recording microphone can withstand is effectively increased, and the occurrence of attachment between the diaphragm and the backplate under the action of high-sound-pressure-level signals is reduced.

2 Claims, 2 Drawing Sheets

BACKPLATE FOR RECORDING MICROPHONE, AND RECORDING MICROPHONE

CROSS REFERENCE TO RELATED APPLICATIONS

The present application is a continuation of international application of PCT application serial No. PCT/CN2021/103174 filed on Jun. 29, 2021. The entirety of each of the above mentioned patent applications is hereby incorporated by reference herein and made a part of this specification.

BACKGROUND

Technical Field

The present application relates to the technical field of acoustoelectric conversion, and in particular to a backplate for a recording microphone, and the recording microphone.

Description of Related Art

A microphone is an essential input device in an electroacoustic system. According to different application scenarios, microphones are classified as recording microphones and measurement microphones. The recording microphones are mainly used for recording music, human voices, etc., which is fundamentally different from the use of the measurement microphones, as the purpose of measurement is to restore the properties of an object truly, while the recording microphones provide users with "pleasant and beautiful" sounds, and its main function is not to restore the original sound as true as possible.

The condenser microphone is a microphone which can be used for recording scenarios, and comprises two polar plates, one of which is a diaphragm, the other is a backplate. When a sound signal acts on the diaphragm, the diaphragm is forced to vibrate, so that the distance between the diaphragm and the backplate changes, which causes a change in the capacitance between the two polar plates, and the sound signal is converted into an electric signal by a polarizing circuit. In a condenser microphone of the related art, when the diaphragm is static, the diaphragm is parallel to the surface, facing the diaphragm, of the backplate, and when a sound signal of high sound pressure acts on the diaphragm, the diaphragm moves towards the backplate under the action of a polarizing voltage, and the two may be infinitely close to each other and easily attached together, leading to instant malfunction of the microphone.

SUMMARY

In order to reduce the occurrence of attachment between the diaphragm and the backplate under the action of sound signals of high sound pressure, the present application provides a backplate for a recording microphone, and the recording microphone.

In a first aspect, a backplate for a recording microphone is provided, which adopts the following technical scheme: in the backplate for the recording microphone, a surface, facing a diaphragm, of the backplate is a spherical surface recessed away from the diaphragm.

By adopting the technical scheme described above, the pull-in voltage of the recording microphone is increased, and the occurrence of attachment between the diaphragm and the backplate under the action of high-sound-pressure-level signals is reduced.

In some embodiments, the chord length of the spherical surface is equal to the diameter of a vibration region of the diaphragm; and the maximum depth at the center of the spherical surface is greater than or equal to the maximum amplitude at the center of the diaphragm.

By adopting the technical scheme described above, the pull-in voltage of the recording microphone is increased, and the sound quality can be improved.

In some embodiments, the spherical surface is formed by laser machining.

By adopting the technical scheme described above, the processing precision of the spherical surface can be improved.

In a second aspect, a recording microphone is provided, which adopts the following technical scheme: the recording microphone comprises the backplate as described above, and a diaphragm on one side, where the spherical surface is located, of the backplate.

In summary, according to the backplate for the recording microphone and the recording microphone provided by the present application, the maximum sound pressure level that the recording microphone can withstand is effectively increased, and the occurrence of attachment between the diaphragm and the backplate under the action of high-sound-pressure-level signals is reduced.

DESCRIPTION OF THE EMBODIMENTS

This application is described in further detail below with reference to FIGS. 1 and 2.

Figure 1:
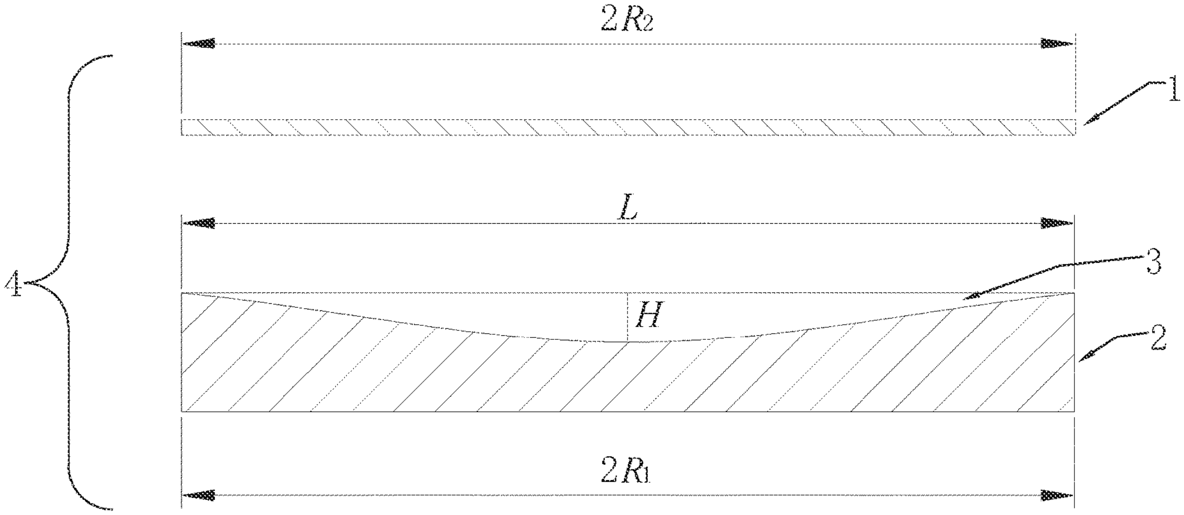
FIG. 1 shows a schematic diagram illustrating a structure of a backplate, and a position relationship between a diaphragm and the backplate.
Figure 2:
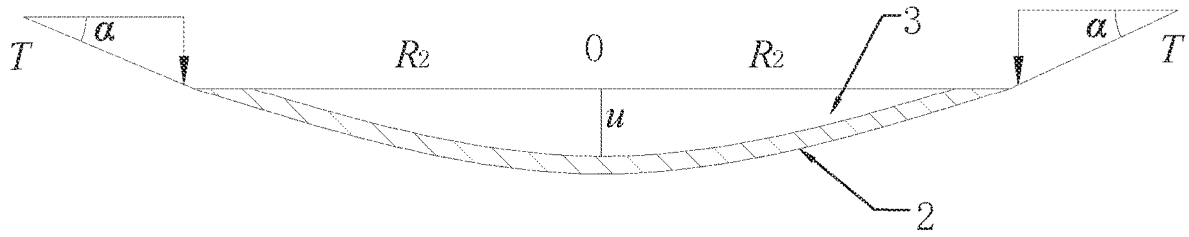
FIG. 2 shows a schematic diagram illustrating the diaphragm in an ideal vibration mode.

Referring to FIG. 1, an embodiment of the present application discloses a backplate 2 for a recording microphone 4, and the backplate 2 is made of metal materials, such as copper, etc., existing in the related art. Due to the fact that a diaphragm 1 during vibration can be a substantially parabolic shape, a surface 3, facing the diaphragm 1, of the backplate 2 may be configured as a spherical surface recessed away from the diaphragm 1 so as to provide a gap for vibration, thereby reducing the occurrence of attachment between the diaphragm 1 and the backplate 2. The spherical surface may be made via processes such as laser machining, etc., so that a good processing precision is ensured for the spherical surface.

In the present application, in order to make the diaphragm 1 better matching with the spherical surface during vibration, the chord length L of the spherical surface is configured to be twice the radius $R_1$ of the backplate 2. The radius $R_1$ of the backplate 2 is configured to be equal to the radius $R_2$ of a vibration region of the diaphragm 1.

In the present application, the maximum depth at the center of the spherical surface is determined in the following way: referring to FIG. 2, according to the vibration mode of the diaphragm 1, the displacement u of the center of the diaphragm 1 away from an equilibrium position is related to the restoring force $F_1$ of the diaphragm 1 during vibration as follows:

$$F_1=-2\pi R_2 T \sin \alpha$$

Where T is the edge tension of the diaphragm 1, and α is the included angle between the edge tension T and the diameter of the diaphragm 1 when the diaphragm 1 is static.

As the amplitude of the diaphragm 1 is small, $$\sin\alpha \approx tg\alpha \approx \frac{u}{R_2},$$

then $$F_1 = -2\pi R_2 T \frac{u}{R_2} = -2\pi Tu$$

According to the performance requirements of the recording microphone 4 and the material properties of the diaphragm 1, the restoring force $F_1$ and the edge tension T of the diaphragm 1 with the maximum amplitude can be calculated. Therefore, the maximum amplitude of the diaphragm 1 is as follows:

$$u = -\frac{F_1}{2\pi T}$$

Here, the maximum depth H at the center of the spherical surface is configured to be greater than or equal to the maximum amplitude u of the diaphragm 1, which is related to the sound pressure level of the scenario where the recording microphone 4 is applied. According to the features of the recording microphone 4, as the depth of the spherical surface increases, the capacitance between the diaphragm 1 and the backplate 2 when the diaphragm 1 vibrates under a high-sound-pressure-level condition increases, so that the sensitivity of the microphone is improved.

In the present application, for example, in a case that the diameter of the vibration region of the diaphragm 1 is 28 mm, the maximum amplitude at the center of the diaphragm 1 in forced vibration with a high-sound-pressure-level signal at a certain resonance frequency is 45 μm. When the maximum depth H at the center of the spherical surface is 45 μm, the center of the diaphragm 1, when getting to the maximum amplitude, is just parallel to the spherical surface, and when the maximum depth at the center of the spherical surface is greater than 45 μm, the diaphragm 1 will keep spaced apart from the backplate 2 when getting to the maximum amplitude, so that the occurrence of attachment between the diaphragm 1 and the backplate 2 is reduced.

In the structure of a conventional recording microphone 2, it generally needs to provide a polyester spacer with a thickness of 40 to 45 μm between the backplate 2 and the diaphragm 1 in order to allow the diaphragm 1 to vibrate freely. In this application, the spherical surface is directly formed on the backplate 2 via laser machining, and therefore the spacer is not needed, so that the integral structure of the recording microphone 4 is simplified, and the assembly efficiency is improved. In addition, in the conventional recording microphone 4, the processing precision of the spacer is generally 45±2 μm, while the processing precision of the spherical surface made via laser machining can reach 45±0.5 μm, so that the output consistency of recording microphone 4 products of same type can be improved, and the output stability of the recording microphone 4 can be improved, which improves the sound quality.

Table 1 shows the data of pull-in voltages obtained with the same signal-to-noise ratio and different resonant frequencies when the maximum depth at the center of the spherical surface is 45 μm.

TABLE 1

Test Data of Pull-in Voltage of Recording Microphone with Spherical Backplate

| Resonant Frequency (Hz) | Capacitance (pF) | Pull-in Voltage (V) | Insulation Impedance (Ω) |
|---|---|---|---|
| 900 | 77.3 | 115 | 4.7 T |
| 1200 | 81 | 135 | 4.7 T |
| 1400 | 85 | 135 | 4.7 T |

As can be seen from Table 1, the pull-in voltage reached 135 V with resonant frequencies of 1200 Hz and 1400 Hz.

Referring to Table 2, in a case that the diameter of the vibration region is 28 mm, when the diaphragm is matched with a common planar backplate, the test data of its pull-in voltages and release voltages are as follows:

TABLE 2

Test Data of Pull-in Voltage and Release Voltage of Recording Microphone with Planar Backplate

| Resonant | 10M High-impedance State | | 1 G High-impedance State | |
|---|---|---|---|---|
| Frequency (Hz) | Pull-in Voltage (V) | Release Voltage (V) | Pull-in Voltage (V) | Release Voltage (V) |
| 900 | 121.4 | 81.3 | 124.3 | 71.3 |
| 1200 | 121.2 | 76.5 | 123 | 74.2 |
| 1400 | 121.4 | 77.8 | 124.7 | 69.5 |

The comparison shows that with the same high-sound-pressure-level signal, when a common planar backplate is used, the maximum pull-in voltage did not exceed 125 V.

Referring to Table 3, in a case that the diameter of the vibration region of the diaphragm is 28 mm, the data of comparison between performance parameters when the diaphragm is matched with a spherical backplate and the planar backplate are as follows:

TABLE 3

Comparison Data of Performance Parameters of Recording Microphones with Spherical Backplate and Planar Backplate

| Parameters | Spherical Backplate | Planar Backplate |
|---|---|---|
| Polarizing Voltage | 120 V | 60 V |
| Sensitivity | −23.4 dB | −32.5 DB |
| Noise | 1.8 Mv/−115.4 dB A | 1.4 Mv/−117.4 dB A |
| Equivalent Noise Level | 2.3 dB A | 9.4 dB A |
| Max In | 3.4 V | 3.6 V |
| Max Out | 3.0 V | 3.2 V |
| Magnification | 0.89 | 0.89 |
| Test Capacitance | 83 pF | 83 pF |

The comparison in Table 3 shows that with the parameters of other parts of the recording microphone constant, when a spherical backplate is used in the recording microphone, the polarizing voltage of the recording microphone is increased from 60 V to 120 V as compared with the planar backplate, and moreover, the equivalent noise level is reduced from 9.4 dB A to 2.3 dB A without attachment of the membrane, so that the sound quality of the recording microphone is effectively improved.

The present application further discloses a recording microphone having the backplate with the spherical surface described above, and a diaphragm on one side, where the spherical surface is located, of the backplate.

According to the backplate for the recording microphone provided by the present application, the surface on the side close to the diaphragm is configured to be a spherical surface, so that the pull-in voltage of the recording microphone is increased, and the occurrence of attachment between the diaphragm and the backplate under the action of high-sound-pressure-level signals, which causes malfunction of the recording microphone, is reduced. Meanwhile, the recording microphone with the backplate according the present application has the advantages of reduced equivalent noise level and improved sound quality.

The above-mentioned preferred embodiments of the present application do not limit the scope of protection of the present application, and therefore: all equivalent variations in the structure, shape, and principles of this application are intended to be within the scope of this application.

What is claimed is:

1. A backplate for a recording microphone, wherein the recording microphone further comprises a diaphragm provided on one side of the backplate, and a surface, facing the diaphragm, of the backplate is a spherical surface recessed away from the diaphragm; wherein a chord length of the spherical surface is equal to a diameter of a vibration region of the diaphragm; and a maximum depth at a center of the spherical surface is greater than a maximum amplitude at a center of the diaphragm.

2. The backplate for the recording microphone according to claim 1, wherein the spherical surface is formed by laser machining.

* * * * *